Dec. 30, 1941.  C. S. HAZARD  2,267,793
REGISTER DRIVE FOR DISPENSING PUMPS
Filed Aug. 21, 1936  5 Sheets-Sheet 1
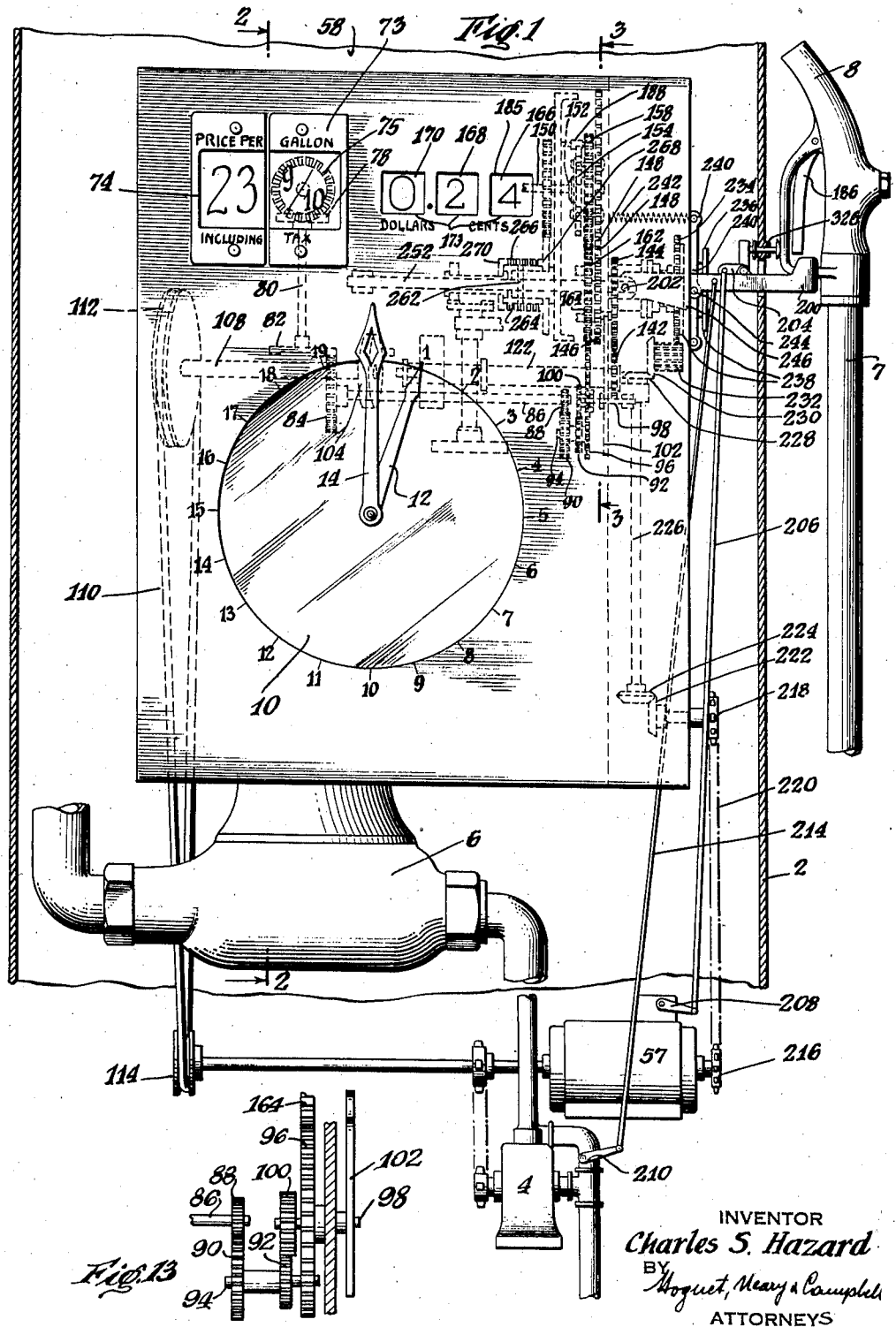
INVENTOR
Charles S. Hazard
BY
Hoguet, Neary & Campbell
ATTORNEYS Dec. 30, 1941.  C. S. HAZARD  2,267,793
REGISTER DRIVE FOR DISPENSING PUMPS
Filed Aug. 21, 1936  5 Sheets-Sheet 2
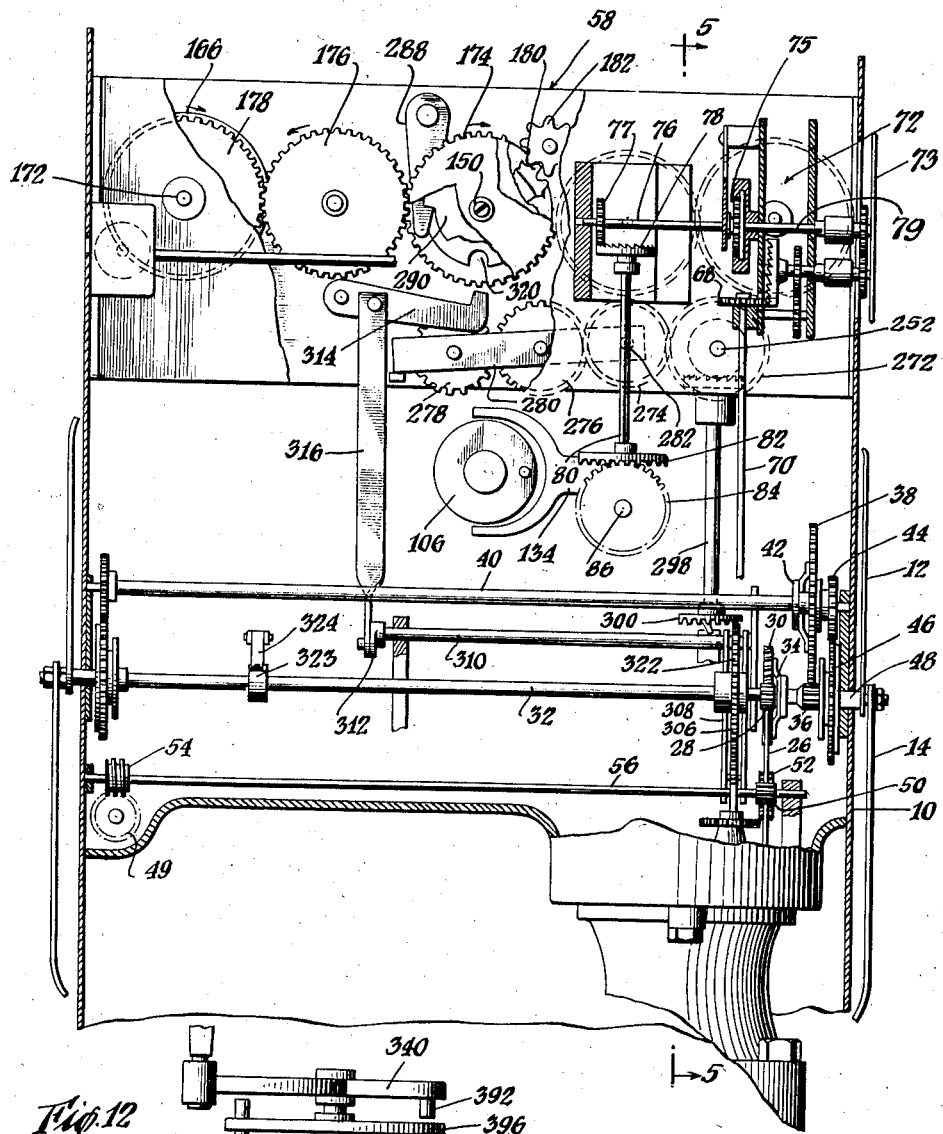
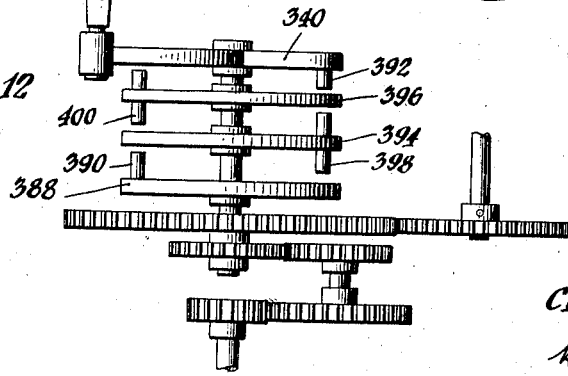
INVENTOR
Charles S. Hazard
BY
ATTORNEYS Dec. 30, 1941. C. S. HAZARD 2,267,793
REGISTER DRIVE FOR DISPENSING PUMPS
Filed Aug. 21, 1936 5 Sheets-Sheet 3
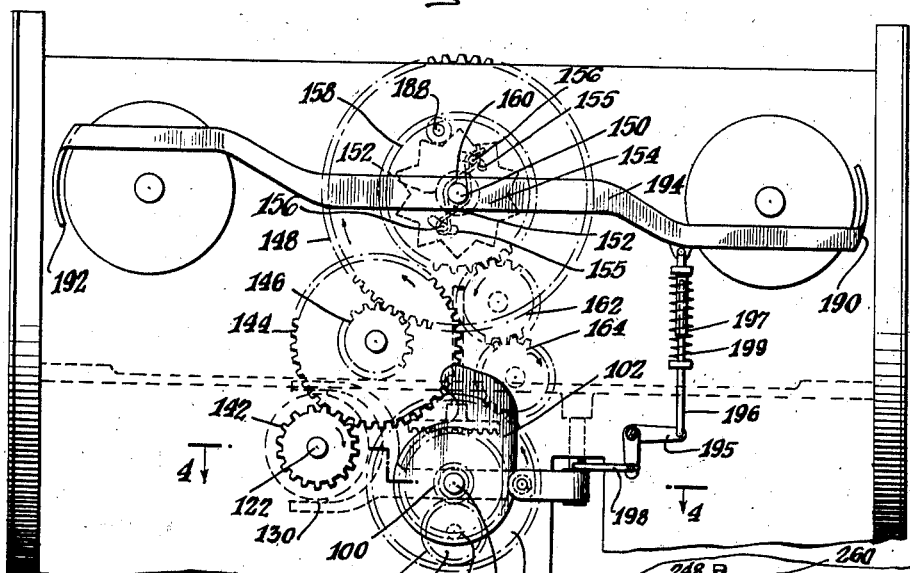
Fig. 3
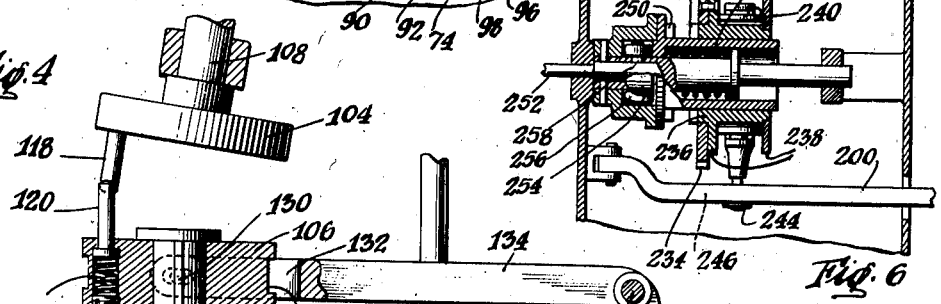
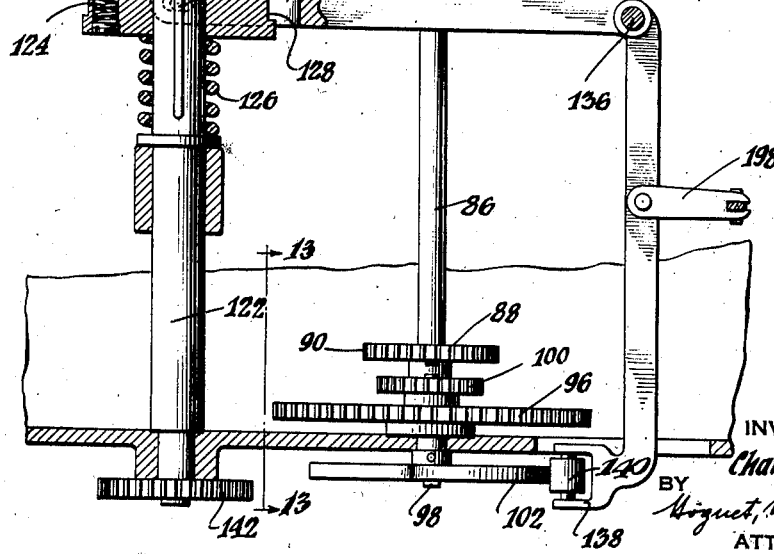
INVENTOR
Charles S. Hazard
BY
Hignet, Henry & Campbell
ATTORNEYS

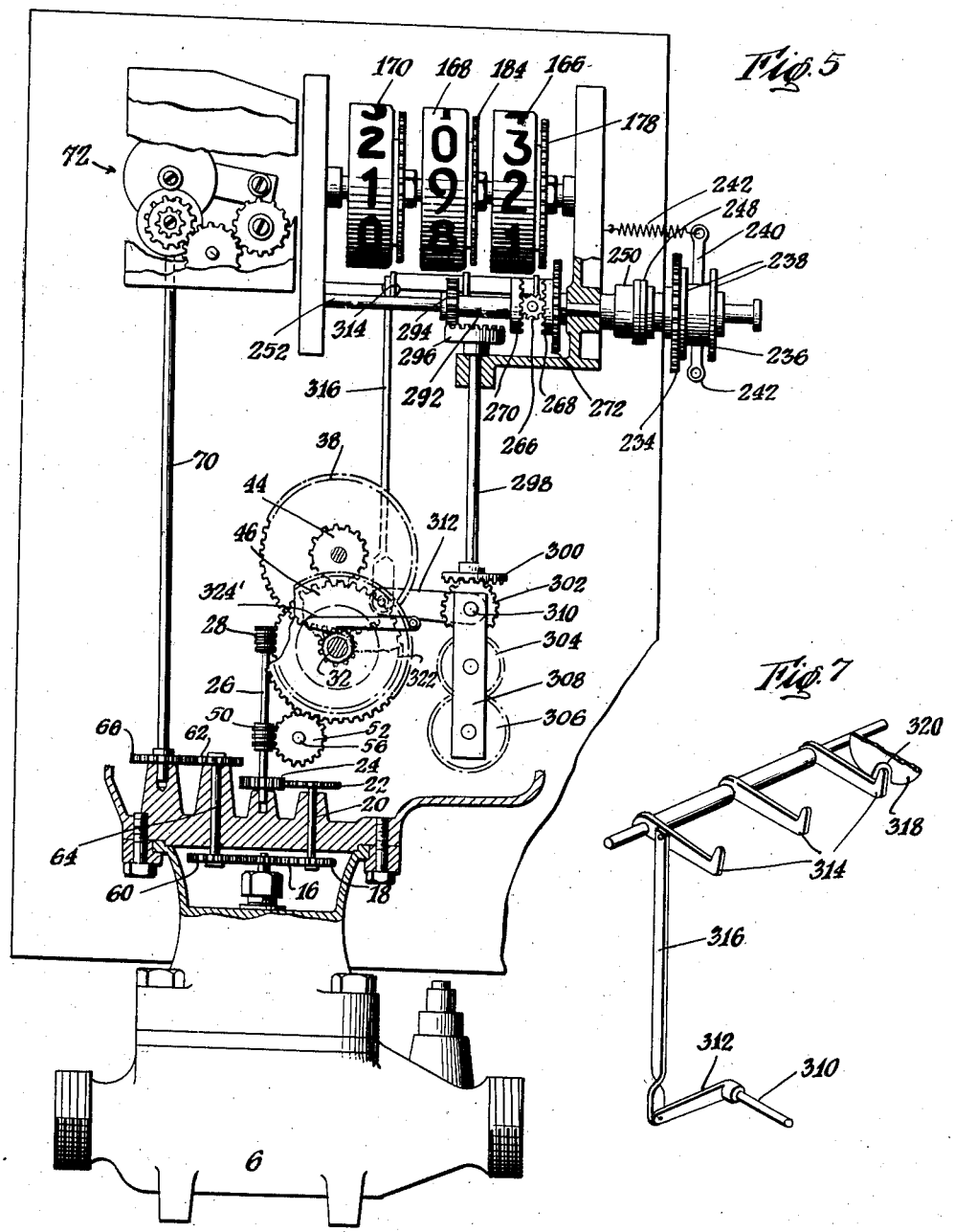

Dec. 30, 1941.  C. S. HAZARD  2,267,793
REGISTER DRIVE FOR DISPENSING PUMPS
Filed Aug. 21, 1936  5 Sheets-Sheet 5
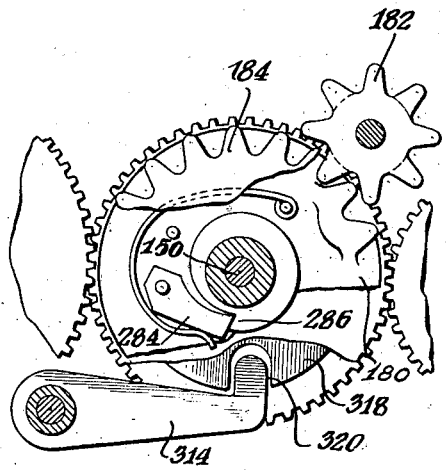
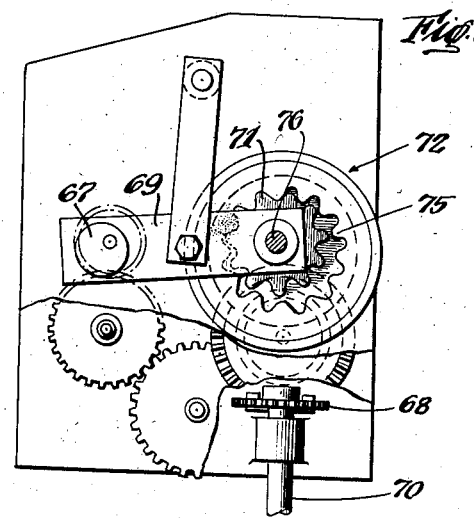
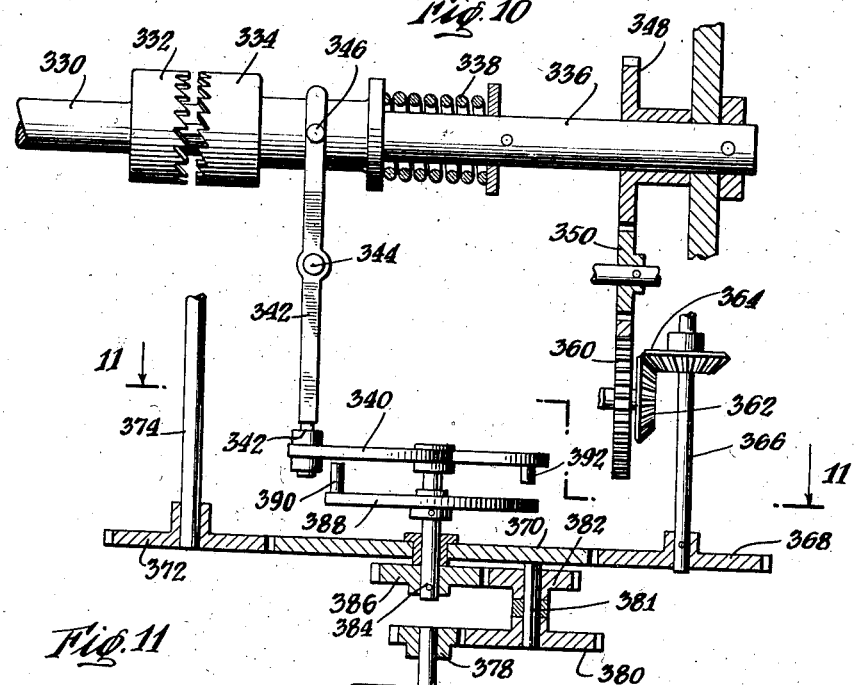
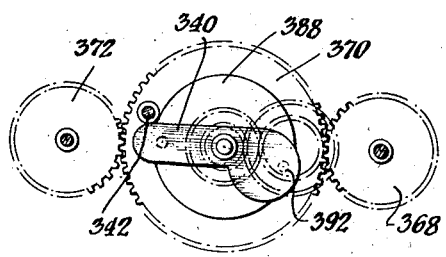
INVENTOR
Charles S. Hazard
BY
Hoguet, Neary & Campbell
ATTORNEYS Patented Dec. 30, 1941

2,267,793

UNITED STATES PATENT OFFICE 2,267,793

REGISTER DRIVE FOR DISPENSING PUMPS

Charles S. Hazard, New York, N. Y., assignor to Neptune Meter Company, a corporation of New Jersey Application August 21, 1936, Serial No. 97,132

15 Claims. (Cl. 221—95)

This invention is directed to improved dispensing pumps of the type used in gasoline filling stations and elsewhere and is particularly applicable to constructions of this type having one or more registers capable of being reset after one dispensing operation and prior to a succeeding operation.

One of the objects of the present invention is to provide a dispensing pump with a mechanically driven register for indicating the quantity and/or the cost of the liquid dispensed in each transaction thereby avoiding the usual direct drive between the meter and the register or registers so that the load imposed on the meter is decreased rendering the meter more accurate in operation.

A further object of the invention is to provide a means for automatically resetting the register or registers to their initial or starting position as an incident to the normal operation of the dispensing pump thereby eliminating the necessity of utilizing manually actuated means for resetting the register.

A further object of the invention is to utilize a single source of power for actuating the register or registers in accordance with the quantity of liquid passing through the meter and for driving a pump for forcing the liquid through the meter.

Another object of the invention is to utilize a single source of power to sequentially actuate a register resetting means, and to drive the pump and the register to properly and accurately register the volume and/or cost of the liquid dispensed in each dispensing operation.

A further object of the invention is to provide a price register actuating means driven independently of but controlled by the meter and including means to orient and control the price register so that it will indicate the cost of the liquid to the nearest cent.

Other and further objects of constructions embodying the present invention will appear from the following detailed description of my invention.

In order to achieve the objects of the invention the mechanism, in a typical construction, may include the usual motor actuated pump for forcing liquid through a meter to the dispensing hose, and an auxiliary device also actuated by the pump motor and operable under the control of the meter to actuate the register to indicate volume and/or the cost of the liquid dispensed.

In that form of the invention more fully described hereafter the means for driving the register from the pump motor includes a clutch releasably connecting the motor to the register. Clutch actuating means for controlling operation of the clutch are provided which include a system of planetary gearing certain of the elements of which are driven by the meter and others of which are driven by the pump motor. Preferably the elements of the clutch actuating means which are driven by the pump motor are arranged so that they tend to disengage the clutch elements permitting the register to stop while the elements of the clutch actuating means which are driven by the meter tend to move the clutch elements into engagement to cause the motor to drive the register. By this arrangement the register is driven by the pump motor but is controlled by the meter in such a way that the register accurately indicates the amount or cost of the liquid actually dispensed. The drive means may be used to actuate either the volume register or the cost register or both registers as desired.

The register drive may also include a detent and ratchet mechanism for automatically centering the units dial of the cost indicator at the nearest unit proportional to the quantity of liquid dispensed thereby definitely and positively indicating to the customer the value of the liquid dispensed avoiding the termination of an operation with portions of two figures displayed and the possibility of confusion and dispute that may arise therefrom.

In order that each transaction may be individually registered on the device without possibility of totaling more than one transaction, the mechanism preferably is provided also with automatic resetting means which if desired may be actuated by the pump motor, to reset the one or both of the registers to zero prior to each dispensing operation, thereby avoiding any possibility of inaccurate or faulty operation on the part of the pump attendant.

For a better understanding of the invention reference may be had to the accompanying drawings, in which:

Figure 1 is a front elevation of a portion of a typical dispensing pump embodying the present invention, parts of the structure being broken away and parts being diagrammatically illustrated;

Figure 2 is a view in section taken on line 2—2 of Figure 1, and partly broken away to disclose certain structural features;

Figure 3 is an end view in elevation of the register drive looking in the direction of the arrows 3—3 of Figure 1 with the planetary gearing thereof shown in broken lines;

Figure 4 is a sectional view of the clutch mechanism taken on line 4—4 of Figure 3;

Figure 5 is an end elevation of suitable resetting mechanism for the price and volume registers taken on line 5—5 of Figure 2 with the register drive removed;

Figure 6 is a sectional view of a portion of the resetting mechanism of Figures 1 and 5 taken on the line 6—6 of Figure 5;

Figure 7 is a perspective view of the control fingers for aiding in the aligning of the drums of the cost register and for controlling the engagement of the reset trolley with the volume indicator;

Figure 8 is an enlarged detail view of a typical transmission drive between the drums of the cost register, partly broken away to show further details thereof;

Figure 9 is an enlarged detail view of a mechanism for regulating the speed of operation of the cost register in accordance with changes in price of the liquid dispensed, parts of the mechanism being broken away;

Figure 10 is a diagrammatic side elevation of an alternative construction embodying motor actuated means for driving both the volume and price registers;

Figure 11 is a sectional view taken on line 11—11 of Figure 10 showing the gearing thereof in plan view;

Figure 12 illustrates an alternative construction of certain elements of the mechanism as applied to the construction of Figure 10; and Figure 13 is a sectional view taken on line 13—13 of Figure 4 showing the planetary gearing in elevation.

Illustrative of one embodiment of the invention, Figure 1 discloses a dispensing pump having both volume and cost indicators, the volume indicator being driven directly from the meter while the cost indicator is driven by the pump motor. The construction illustrated includes a housing 2, supporting a pump 4 for forcing liquid through a meter 6 of any desired type to a dispensing hose 7 and nozzle 8. The meter 6 drives a volume indicator consisting of a dial 10, unit pointer 12 and fractional unit pointer 14 which indicate the volume of liquid dispensed in a known manner. As the meter 6 is actuated by passage of liquid therethrough it rotates a train of gears (Figures 2 and 5) including gear 16, pinion 18 fixed to the lower end of shaft 20, pinion 22 fixed to the upper end of shaft 20 and gear 24 fixed to shaft 26. The latter shaft is provided with a worm 28 at its upper end meshing with worm gear 30 rotatably mounted on shaft 32 to which is fixed the fractional units pointer 14. Shaft 32 also carries a friction clutch 34 bearing against worm gear 30 to cause the pointer 14 to rotate therewith but permitting rotation of the shaft relative to gear 30 during the resetting operation.

The units pointer 12 is driven from shaft 32 by reduction gearing including a pinion 36 secured to shaft 32 and meshing with a gear 38 supported on shaft 40 and rotatable therewith through a friction clutch 42. Shaft 40 carries a fixed pinion 44 that drives gear 46 fixed to a sleeve 48 and rotatable on shaft 32, the sleeve 48 carrying units pointer 12 at its outer end. The pinions and gears 36, 38, 44 and 46 are of such ratio that one complete revolution of fractional units pointer 14 will cause units pointer 12 to be advanced one unit on the dial 10. The dial 10 may be divided into twenty units, for example, each of which is the equivalent of one gallon in which case the gear ratio of the reduction gears will be twenty to one requiring twenty revolutions of fractions pointer 14 to produce one complete revolution of units pointer 12.

If it is desired to totalize the quantity of liquid dispensed for a plurality of dispensing operations, a small register 49 (Figure 2) may be driven by the meter 6 through worm 50 on shaft 26 and worm gears 52 and 54 fixed to transverse shaft 56. The register 48 may be of any desired type, its particular construction forming no part of the present invention.

As best shown in Figures 1 and 2, the dispensing device includes a register generally indicated as 58 of a suitable type which indicates the cost of the liquid dispensed during a dispensing operation and having numeral wheels which are displaced from an initial position in an amount equal to the volume of liquid dispensed multiplied by the prevailing cost of the liquid per unit of volume. This register hereinafter referred to as the "cost register" is driven by the pump motor 57, but is controlled by the meter 6 through suitable means which preferably include clutch actuating means serving to automatically establish and disestablish a driving relation between the pump motor and the register.

Referring to Figure 5, as the meter 6 operates it drives pinion 16 and a train of gears 60 and 62 fixed to opposite ends of shaft 64 and gears 66 and 68 fixed to the opposite ends of vertical shaft 70 (Figures 2, 5 and 8) thereby driving a suitable price variator mechanism 72 which as illustrated may be of the type disclosed in applicant's copending application Serial No. 23,148, filed May 24, 1935, now Patent No. 2,069,184 dated January 26, 1937. Briefly this mechanism consists of a gear train in which gears of different ratios carried by replaceable price targets 73 and 74 (Figures 1 and 2) may be substituted to drive an internally toothed gear 75 and move a pinion 71 meshing therewith in the path of a circle so as to rotate shaft 76 at a predetermined speed with respect to the speed of rotation of meter 6. The gears of the target representing the price in units are adapted to vary the speed of the internally toothed gear 75 relative to the speed of the meter driven shaft 70 in accordance with the gear ratio of the particular price target selected. The gears of the price target indicating fractions of a unit operate to drive an eccentric 67 which engages and oscillates a lever 69 in such a manner as to cause the pinion 71, carried by the lever, to move in the path of a circle, the teeth of the pinion being always in engagement with the teeth of the internal gear 75. Each oscillation of the lever 69 causes the gears 71 and 75 in transmitting motion to the shaft 76 to gain or lose a certain number of teeth with respect to the rotation of the shaft 79 from which the internal gear 75 receives its motion, depending on the relative direction of rotation of the eccentric 67 and the shaft 79. Since the rotation thus imparted to shaft 76 may be varied relative to the rotation of shaft 79 by reason of the oscillation of the lever 69, the effect is to add to or subtract from the rotation of the shaft 79 an increment or decrement determined by the ratio of the gears of the fractions price target. The speed of rotation of the shaft 76 with respect to the meter, of course, varies in accordance with the ratio of the gears carried thereby, whereas the size and relation of the gears of the price targets varies with the price of the liquid per unit volume indicated on the price targets. For a further detailed description of the particular price variator used, reference may be had to the disclosure thereof in applicants' aforementioned patent No. 2,069,184.

Shaft 76 which is driven by the meter through the price variator, drives the elements of the clutch actuating means by which the meter controls the operation of the cost register and the driving connection between the register and pump motor. Rotation of shaft 76 is transmitted through gear 77 and crown gear 78 to vertical shaft 80 (Figures 1 and 2). Crown gear 82 on the lower end of shaft 80 meshes with spur gear 84 to drive horizontal shaft 86 carrying at its right hand end (Figures 1 and 13) a pinion 88 meshing with a gear 90. Gear 90 is secured to a smaller gear 92 and both gears are rotatably supported on a shaft 94 carried by a relatively larger gear 96 rotatably mounted on a stub shaft 98 coaxial with shaft 86. The shaft 98 carries at its innermost end a gear 100 meshing with gear 92 while the outer end of the shaft carries a clutch operating cam 102 (Fig. 4). The shaft 94 on which gears 90 and 92 rotate is secured to gear 96 in a position eccentric to shafts 86 and 98 so that rotation of gear 96 causes gears 90 and 92 to travel therewith about gears 88 and 100 respectively which thus serve as the sun gears of a planetary system. However since gears 90 and 92 are of unequal size, any rotation of these gears about gears 88 and 100 must be accompanied by compensating rotation of either meter driven gear 88 or cam actuating gear 100.

Movement of the clutch actuating cam 102 is controlled by the planetary system in response to a differential in the corresponding rates of operation of the meter and the motor driven register to actuate the clutch mechanism. The clutch shown comprises two angularly disposed disks 104 and 106 (Figures 1 and 4) the former being fixed to a shaft 108 journalled in the framework of the register housing and rotated by motor 57 through a belt or chain 110 and cooperating pulleys 112 and 114. Clutch disks 104 and 106 carry cooperating pins 118 and 120 respectively which engage to establish a driving connection between motor driven shaft 108 and shaft 122. The pin 120 is slidably supported in disk 106 and is urged outwardly by a spring 124 permitting the pin 120 to retract slightly if it strikes the disk 104. Clutch disk 106 is keyed to shaft 122 for sliding movement thereon and is normally urged toward disk 104 by spring 126. However, clutch disk 106 may be moved longitudinally away from disk 104 against the action of spring 126 to terminate the driving relation by operation of the cam 102 of the clutch actuating means. For this purpose the disk 106 is provided with a peripheral groove 128 receiving pins or rollers 130 carried by a yoke 132 (Figures 2 and 4) at one end of a bell crank lever 134 pivotally supported at 136 on the framework. The opposite end of the bellcrank lever 134 is provided with a yoke 138 carrying a roller 140 which is urged against cam 102 by spring 126. With this construction, if the cam 102 is rotated in a clockwise direction as viewed in Figure 3 the bell crank lever 136 will be rotated in a counter-clockwise direction as viewed in Figure 4, and the clutch pin 120 will be moved out of engagement with pin 118 on clutch disk 104, thereby terminating rotation of shaft 122 until the pins 118 and 120 again engage. When the cam 102 rotates in the opposite direction bell crank 136 moves in a clockwise direction to reestablish the driving relation.

When driving the cost register, shaft 122 is rotated by motor 57 through the clutch pins 118 and 120. A pinion 142 fixed to the outer end of shaft 122 rotates interconnected gears 144 and 146 (Figures 1 and 3) the latter meshing with a large gear 148 fixed on the main drive shaft 150 of the cost register 58. This train of gears, namely, gears 142, 144, 146 and 148 transmits the rotation of the motor driven shaft 122 to the cost register 58 to drive the same.

The motor driven elements of the planetary gear system for actuating the clutch cam 102 are driven by gear 158 mounted on the main register drive shaft 150 (Figs. 3, 4 and 13). The gear 158 meshes with the idler pinion 162 that in turn drives a second idler pinion 164 meshing with the large gear 96 of the planetary gear system. The gear 96 which carries eccentric shaft 94 on which gears 90 and 92 are mounted is thus rotated by the pump motor through the driving connection to the register. When the clutch members are engaged the gears 90 and 92 therefore are carried by the gear 96 and rotate about gears 88 and 100 as the gear 96 rotates.

The operation of the clutch actuating mechanism described is as follows:

When the pump motor is energized prior to the dispensing of liquid, the meter is not driven and the clutch disk 106 is disengaged from the clutch disk 104 so that the register is not driven. Thereafter on operation of the meter, shaft 86 is rotated driving gear 88 and rotating gears 90 and 92. At this time the gear 96 and shaft 94 are stationary since no driving connection has been established between the pump motor and the register, therefore gears 90 and 92 which are of unequal size drive gear 100 which is secured to shaft 98 to rotate the clutch cam 102. The bell crank 134 is then actuated by the clutch cam causing the clutch disk 106 to be moved into position to bring the pin 120 carried thereby into engagement with pin 118 on the clutch disk 104 establishing a driving connection between the motor and the register through shaft 122 and gears 142, 144, 146 and 148. The register is then driven by the pump motor. At the same time gear 148 also drives gear 158 and gears 162 and 164 to rotate gear 96 of the clutch actuated means. Upon rotation of gear 96, gears 90 and 92 which are carried thereby rotate about gears 88 and 100, but since gears 90 and 92 are of unequal size they would rotate gear 100 were it not for the fact that gear 88 is driven by the meter. The speed of rotaton of the gear 88 by the meter is such that the gear 100 and clutch cam 102 will remain stationary as long as the operation of the cost register 58 corresponds to the operation of the meter. However, upon termination of a dispensing operation, which causes the meter to cease rotating, or upon operation of the register faster than the meter, the gear 88 ceases to rotate or fails to rotate fast enough to permit idling of the gear 92 about the gear 100. At such times the gear 88 lags causing a compensating rotation of gear 100 and shaft 98 thereby actuating the clutch operating cam 102 to disengage the clutch members and terminate the register drive.

In normal operation it is preferred that the pump motor tend to drive the register faster than permitted by the meter so that the pump motor continually tends to rotate the clutch cam in such a way that it will disconnect the driving relation between the pump motor and the register. On the other hand the meter tends to rotate the clutch cam in a direction which establishes the driving connection between the pump motor and the register. Thus in operation the motor driven elements of the planetary system serve to disengage the register drive whereas the meter driven elements of the system reestablish the drive. In this way the operation of the register is controlled by the meter to accurately indicate the operation of the meter although the actual drive of the register may be momentarily interrupted from time to time as the driving connection is disestablished and reestablished.

The cost register employed may be of any desired type such as that disclosed in applicant's copending application Serial No. 83,030 filed June 2, 1936, but for purposes of explanation it is illustrated in Figures 2 and 5 as of conventional type including the usual units drum 166, tens drum 168 and hundreds drum 170 individually supported for rotation on a shaft 172 in the framework of the register 58 and visible to the attendant and patron through the windows 173 in the register housing. The register drive shaft 150 actuates the units drum 166 through a gear 174 fixed to shaft 150 and meshing with idler gear 176 which in turn drives gear 178 fixed to drum 166. Shaft 150 also carries a two tooth mutilated gear 180 fixed thereon for intermittently rotating an idler pinion 182 (Figures 2 and 7) which in turn rotates a gear 184 rotatably mounted on shaft 150 for displacing the tens drum 168 one tens unit for every complete rotation of the units drum 166.

In a like manner and through a similar system of gearing the hundreds drum 170 is driven from the tens drum 168, displacement of one numeral on the hundreds drum being produced by each complete revolution of the tens drum, until a dispensing transaction is concluded by closing the valve 186 in the hose nozzle, terminating operation of meter 6 by stoppage of liquid flow therethrough.

In the operation of the cost register it is desirable that the movement of the units drum 166 be such that a dispensing operation can not be terminated with a portion of two numbers appearing in the window 173, through which the units numeral drum is observed. In order to accomplish this the mechanism may be provided with means for advancing the units drum step by step so that each number will be wholly visible until the drum is moved on to display the next numeral and portions of two numbers will not be presented at the window. The construction illustrated for effecting this result embodies a hub 152 fixed to the main drive shaft 150 of the cost register and provided with a star-shaped member 154 which cooperates with a spring detent 188 for advancing the numeral wheels in steps of a full unit each. The star-shaped member is provided with a pair of arcuate slots 155 through which extend a pair of pins 156 projecting from the face of the gear 158 which is rotatably mounted on shaft 150. The pins 156 are normally retained centrally of the slots 155 by means of spring fingers 160 fixed to hub 152, the star-shaped member 154 and gear 158 thus permitting limited movement relative to the hub 152 in driving the shaft 150.

In the driving of the cost register by the pump motor the operation of the clutch members may at times cause slight interruptions or apparent irregularities in the rotation of the numeral drums of the register which if observed by the customer might be confusing. It may therefore be desirable in some cases to cover the numeral drums during the dispensing operation or when the movement of the cost register is not exactly synchronized with the movement of the volume register.

As best shown in Figure 3 the dispensing device therefore may include a pair of shutters 190 and 192 supported at opposite ends of a lever 194 pivotally mounted on the frame of register 58 for oscillatory movement to cover and uncover the exposed faces of the drums 166, 168 and 170. The shutters 190 and 192 may be swung into drum covering position in any desired manner during the dispensing operation but they have been illustrated as being moved by means of a link 196 pivotally connected to lever 194 and to a bellcrank 195 pivotally mounted in the frame of the device. The bell crank in turn is connected by link 198 to clutch actuating bell crank 134. With this construction the shutters 190 and 192 are moved into indicator drum covering relation when the clutch elements are disconnected and into uncovering relation when the cost register is being driven by the motor. If desired a loose connection including sleeve 197 and spring 199 may be interposed in the link 196 or elsewhere to prevent rapid or intermittent movement of the clutch from producing flickering of the shutters allowing the shutters to remain either fully open or fully closed while liquid is being dispensed but to be fully opened when the operation is terminated and the clutch remains disengaged.

Resetting mechanism

In order to reset the cost and volume registers to their original zero position after one dispensing operation and prior to another dispensing operation suitable resetting means may be provided. That shown in the drawings is automatically operated and embodies certain of the principles of operation of the applicant's copending application Serial No. 83,030, referred to above. In this construction a hose support 200 is pivoted at 202 in the framework of the device and is held in its lowermost position by its own weight and also by the weight of hose 7 and nozzle 8 when the latter is placed thereon. When the nozzle 8 is removed from the support 200, the support may be lifted upwardly displacing a small bellcrank lever 204 pivoted on the frame of the device so that it is moved in a clockwise direction and acts through link 206 to throw motor switch 208 to "on" position. Simultaneously, therewith a valve 210 in a bypass 212 extending from the outlet side of pump 4 to the inlet side thereof is opened by means of link 214 connected to hose support 200 whereby liquid discharged by the pump 4 is merely recirculated instead of being forced through the meter 6.

The motor 57 drives sprockets 216 and 218 over which chain 220 passes (Fig. 1) to rotate gears 222 and 224 and shaft 226. Gear 228 at the upper end of shaft 226 meshes with gear 230 secured to barrel gear 232 which transmits rotation to a resetting clutch and idler member 234. This idler and clutch consists generally of a sleeve 236 having spaced flanges 238 thereon receiving a yoke 240 pivotally connected to the framework of the device below the sleeve 236 and urged in a counterclockwise direction (Figures 1 and 5) by a tension spring 242. Yoke 240 carries a pin or roller 244 (Figure 1) which is engageable with an inclined cam 246 on the lower edge of the hose support 200, thereby retaining the yoke 240 against movement to the left (Figure 1) when the hose support 200 is in its lower position. When the support 200 is moved upwardly the cam 246 moves from behind the roller 244 permitting the yoke 240 to shift clutch element 248 on sleeve 236 to the left (Figures 1, 5 and 6) to engage and rotate a complementary clutch element 250 shiftable axially of and rotatable with respect to resetting shaft 252. Clutch element 250 is provided with a pair of diametrically spaced cams 254 concentric with shaft 252 which are urged by a spring 260 into engagement with rollers 256 carried on a pin 258 extending through shaft 252, the rollers 256 being normally disposed in the valleys the cams 256 causing resetting shaft 252 to rotate with sleeve 236.

As best shown in Figures 1 and 5, resetting shaft 252 is provided with a transversely disposed shaft 262 carrying pinions 264 and 266 at its outer ends which mesh with opposed crown gears 268 and 270. The gears 268 and 270 are rotatably mounted on shaft 252 and operate first to reset the cost register 58 and thereafter to reset the volume register to zero position. In resetting the cost register the gears 264 and 266 and crown gears 268 and 270 rotate together with shaft 252. Spur gear 272 which is integral with crown gear 268 rotates with shaft 252 and drives gear 274 of a reset trolley consisting of three meshing gears 274, 276 and 278. The latter gears are rotatably mounted between two plates 280 swingably mounted on a shaft 282 which also supports gear 274. The plates 280 frictionally engage the sides of gear 278 tending to restrain it from rotating thereby causing the trolley including plates 280 and the gears 276 and 278 to swing upwardly until gear 278 engages with gear 174 on the register drive shaft 150. The drive shaft is then driven in a direction to return the units drum 166 toward zero position. Units drum in turn picks up the tens and hundreds drums 168 and 170 by the operation of pawls 284 and ratchets 286 (Figure 8) of the type now used in register resets, returning all the drums to zero position. On reaching the zero position a stop pawl 288 engages a ratchet 290 (Figure 2) movable with the hundreds drum 170 to stop all the drums at zero position and also to prevent further rotation of spur gear 272 and attached crown gear 268.

Continued rotation of reset shaft 252 after the cost register has been reset and gear 272 held against further rotation causes gears 264 and 266 carried by shaft 252 to rotate on crown gear 268 driving the opposite crown gear 270. A sleeve 292 to which crown gear 270 is secured is rotatable on shaft 252 and acts through spur gear 294 and crown gear 296 to drive shaft 298. A crown gear 300 is secured to the lower end of shaft 298 and serves to drive a second swinging reset trolley similar to that employed for resetting the cost register 58. This reset trolley consists of three gears 302, 304 and 306 rotatably mounted between spaced plates 308. The plates 308 are fixed to a shaft 310 which is journalled in the frame of the device at its opposite end with a lever 312 movable to swing the gear 306 into engagement with gear 322 of the volume indicator to reset the same. The shaft 310 and reset trolley are retrained against movement into a position to effect resetting of the volume register during resetting of the cost register by a series of rigidly connected fingers 314 pivotally supported in the frame of the register 58 and connected by link 316 to lever 312. The fingers 314 bear against three disks 318 (Figure 8) all of the disks being mounted on the register drive shaft 150 and individually fixed one to each of the drive gears of the units, tens, and hundreds drums as shown in Figure 8. Each of the disks 318 is provided with a peripheral notch 320, the notches being aligned axially of drive shaft 150 when the same numerals on the drums 166, 168 and 170 are aligned, and being disposed in a downwardly opening position when the cost register 58 is at zero position. The fingers 314 can then move upwardly into the notches 320 to raise link 316 and rotate lever 312 and shaft 310 to swing the plates 308 and gear 306 of the reset trolley into mesh with a reset gear 322 fixed to units pointer shaft 32. Rotation of the resetting shaft 252 is thus transmitted to the volume register to rotate it counterclockwise toward zero.

During the rotation of shaft 32, worm gear 30 is allowed to remain stationary through slippage of friction clutch 34 and shaft 40 is also permitted to remain stationary through slippage between gear 38 and friction clutch 42. Pinion 36 carries the usual pawl and a ratchet acting to "pickup" gear 46 on sleeve 45 to bring the units and fractional units pointers 14 and 12 back to zero position where a single tooth ratchet 323 on shaft 32 engages a pawl 324 pivotally supported on the framework to stop the volume register pointers at zero position. Further rotation of register reset shaft 252 is then prevented.

Continued rotation of the motor driven sleeve member 236 and clutch elements 248 and 250 by the motor 57 causes the cams 254 (Figure 6) of the clutch element 250 to ride up on rollers 256 displacing clutch element 250 and sleeve 236 to the right as viewed in Figure 1. The support 200 then drops and the cam 246 carried thereby passes downward behind the roller 244 preventing the yoke 240 from again moving to the left. The clutch element 248 is thus held disengaged from clutch element 250 and the rollers 256 again drop into the valleys adjacent cams 254 so that the motor 57 is disconnected from the reset shaft 252 and the register may be driven to register the cost of the liquid dispensed in the next operation, the reset trolleys disengaging from the gears 174 and 322 by their own weight upon the disengagement of the clutch elements 248 and 250.

As support 200 drops after resetting of the register, the valve 210 in pump bypass 212 is closed and the liquid is directed from pump 4 to the meter 6. Thereafter upon opening valve 186 in the hose nozzle a dispensing operation can then take place and the cost and volume indicators will be actuated in the manner previously described.

The motor 57 is stopped when the hose and nozzle 8 are placed upon the support, a portion of the nozzle engaging a pin 326 and displacing switch actuating bellcrank 204 to move the switch to "off" position terminating the operation.

The mechanism described above embodies means driven by the pump motor for actuating the cost register while the volume register is driven directly from the meter. However, the invention may be used to drive both the cost and the volume register of a dispensing pump. The drive means shown in Figures 10 and 11 may be used for this purpose and includes a driving connection between the motor and registers which is established and disestablished under normal conditions by means of clutch mechanism operable to prevent drive of the indicators in advance of the meter. In this construction a shaft 330 driven from the motor 57 of Figure 1 by any suitable means is provided with a clutch element 332 cooperating with a complementary clutch element 334, slidably mounted on shaft 336 journalled in the frame of the dispensing device. The clutch elements are normally urged into driving relation to actuate the indicators by a spring 338 surrounding shaft 336 and urging the clutch element 334 to the left as viewed in Figure 10. However, the clutch elements may be disengaged when necessary to prevent overrunning of the indicators by means of a clutch operating cam 340 controlled by both the motor and the meter through suitable means such as a system of planetary gears.

The cam 340 upon rotation in a clockwise direction as seen in Figure 11 moves the lower end of lever 342 to the left as seen in Figure 10 swinging the lever about its pivot 344 to move the upper end thereof to the right against the action of spring 338. A yoke 346 is provided at the upper end of lever 342 for engaging clutch element 334 to move the latter out of engagement with the clutch member 332 on rotation of cam 334.

Power supplied by the motor to shaft 330 is transmitted to a volume register such as that of Figure 1 through gear 348 rotatable with shaft 336 and meshing with an idler gear 350 which drives gear 360. The gear 360 carries a relatively fixed bevel gear 362 meshing with a similar bevel gear 364 fixed to vertical shaft 366 which drives the fractional units pointer of a volume register through suitable gearing such as that illustrated in Figure 1. The units drive shaft of the indicator may be driven from the fractional units drive shaft or otherwise as desired to indicate the volume of liquid dispensed.

The cost register is also driven from shaft 366 through a spur gear 368 which rotates planetary gear 370, and cost register drive gear 372 fixed to vertical shaft 374. The shaft 374 may be connected through a price variator device such as that of Figure 8 to a cost register similar to that of Figures 1 and 2 or of any other suitable type so that rotation of shaft 336 is directly transmitted to both the cost and the volume registers.

As in the case of the register drive of the first described modification the motor tends to drive the registers at a higher rate of speed than the meter 2 would normally drive them. In order to maintain the total amounts indicated on the registers proportional to the quantity of liquid dispensed, a type of planetary gearing similar to that shown in Figure 1 is utilized to rotate the clutch operating cam 340 to engage and disengage the clutch elements 332 and 334. To this end meter shaft 376 carries a pinion 378 meshing with a gear 380 rotatably mounted on a shaft 381. The shaft 381 is carried by planetary gear 370 and is mounted eccentric to shaft 384 about which gear 370 rotates. Gear 380 is formed integral with a smaller gear 382 which meshes with gear 386 to secure the shaft 384. The shaft 384 is provided with a clutch disk 388 having a pin 390 projecting therefrom to engage pin 392 carried by the clutch actuating cam 340.

The operation of the planetary gear system controlling the register drive by the meter in this construction is similar to the operation of that of the construction of Figures 1 to 9. Assuming the meter to be at rest and the clutch members 332 and 334 disengaged as at the start of a dispensing operation, the motor may be energized without driving the registers. Thereafter on dispensing liquid from the device the meter will be driven rotating gear 378 to drive gears 380, 382 and 386, the gear 370 and shaft 381 carried thereby remaining stationary. Rotation of gear 386 causes shaft 384 and disk 388 to be rotated bringing pin 390 into engagement with pin 392 on clutch operating cam 340. The cam is thus rotated to permit the lower end of lever 342 to swing to the right of Figure 10 bringing clutch members 332 and 334 into engagement for driving the cost and volume registers.

Upon rotation of the registers faster than permitted by the meter or upon stopping of the meter the motor continues to drive the registers and gear 370 through the clutch means. Rotation of gear 370 carries shaft 381 and gears 380 and 382 therewith about the gears 378 and 386. However, since gear 380 is larger than gear 382 the rotation of gear 380 in mesh with gear 378 when the latter is stationary or rotating relatively slowly is accompanied by compensating rotation of gear 386 by gear 382. The shaft 384 is thus rotated moving clutch actuating cam 340 through operation of the interposed disk 388 and pins 390 and 392. The rotation of cam 340 in this case is opposite to that on starting a dispensing operation and serves to move the lower portion of lever 342 to the left (Figure 10) moving the yoke 346 and clutch member 344 to the right to disengage the clutch members and terminate the drive of the registers.

In normal operation of the parts described the motor tends to drive the registers faster than the meter so that the clutch operating cam tends to terminate the motor drive while the meter tends to reestablish the drive. In this way accurate operation of the registers is assured since the motor drive is terminated when the meter slows down or ceases to operate while the meter operation reestablishes the driving relation.

The resetting means employed when using the driving connection of Figures 10 and 11 may be the same as that illustrated in Figure 1. In fact the entire drive means of Figures 10 and 11 may be embodied in the construction of Figures 1 to 9 and used in combination with the elements there shown and described replacing the separate drive means for the volume and cost indicators.

As described above it is preferred that the motor 57 be arranged to drive either one or both of the registers faster than permitted by the meter. However, in some instances it may happen that the meter will operate faster than the motor in which case it may be necessary for the registers to continue to operate after the meter has stopped and until they have registered the complete operation of the meter. For this purpose a lost motion connection may be provided between the meter and the clutch cam.

As embodied in the construction of Figures 10 and 11 the means employed to permit operation of the register and meter at different speeds includes the pins 390 and 392 which enable the disk 388 actuated by the planetary gears to be moved without operating the clutch cam on separation of the pins 390 and 392. Thereafter if the meter should stop or slow down, the motor driven elements continue to rotate causing the planetary gearing to rotate the clutch cam 340 until pin 392 again engages pin 390 and the cam is moved to disengage the motor drive. With this construction the meter may run ahead of the motor by an amount sufficient to rotate the disk 388 one complete revolution (less the diameter of pin 392).

As shown in Figure 12 the amount of lag of the motor driven elements behind the meter may be increased further as desired by introducing idler plates 394 and 396 between disk 388 and clutch cam 340. A pin 398 carried by the plate 394 extends downward to be engaged by pin 390 on the disk 388 and extends upward to engage pin 400 on the idler plate 396. The pin 400 in turn extends upward to engage pin 392 on the clutch cam 340. With this construction the meter may operate to advance disk 388 substantially one complete revolution away from the pin 398 on the idler plate 394 and the idler plate may advance substantially another complete revolution to bring pin 396 into engagement with pin 400 on idler plate 396. The latter plate in turn may rotate another revolution before pin 400 engages the pin 392 on the clutch cam, to start the motor drive of the registers. Thereafter if the meter should stop or rotate more slowly than the registers, the registers will continue to be driven until the disk 388 rotates in the opposite direction far enough to pick up the idler plate 394 and 396 to actuate the clutch cam and terminate the register drive. In this way accurate register operation is assured without frequent operation of the clutch.

Should it be desired to introduce either more or less lag between the motor and the registers additional idler plates may be inserted or removed from between the disk 388 and the clutch cam 340.

When driving either one or both of the registers from the pump motor or any other motor employed for this purpose any suitable driving connection may be used in the place of that herein shown and described for the purpose of indicating the nature of the invention and a typical embodiment thereof. Similarly the form and type of dispensing pump and resetting mechanism employed as well as other elements of the combination may be varied or omitted as desired to provide a preferred construction. It should therefore be understood that the embodiments of the invention herein shown and described are intended to be illustrative of the invention and are not intended to limit the scope thereof.

I claim:

1. In a liquid dispensing device the combination of a meter, a pump, a motor for actuating the pump to force liquid through the meter, and an indicator actuated by said motor under the control of the meter for displacing the indicator away from a predetermined position in proportion to the quantity of liquid dispensed and means actuated by said motor for resetting said indicator to initial position.

2. In a liquid dispensing device the combination of a meter, a pump, a motor for actuating said pump to force liquid through said meter, an indicator actuated by said meter for indicating the quantity of liquid dispensed and a register for indicating the cost of the quantity of liquid dispensed actuated by said motor under the control of the meter movable away from an initial position in proportion to the quantity of liquid dispensed.

3. In a liquid dispensing device the combination of a meter, a pump, a motor for actuating said pump to force liquid through said meter, an indicator actuated by said meter movable away from initial position in proportion to the quantity of liquid dispensed, a second indicator actuated by said motor under the control of said meter movable away from an initial position in proportion to the quantity of liquid dispensed, and power actuated means for resetting both indicators to initial position.

4. In a liquid dispensing device the combination of a meter, a pump, a motor for actuating said pump to force liquid through said meter, an indicator actuated by said meter movable away from initial position in proportion to the quantity of liquid dispensed, a second indicator actuated by said motor under the control of said meter and also movable away from an initial position in proportion to the quantity of liquid dispensed, and means actuated by said motor for resetting both indicators to zero.

5. In a liquid dispensing device the combination of a meter, a pump, a motor for actuating said pump to force liquid through said meter, an indicator for indicating the volume of liquid dispensed, a second indicator for indicating the cost of the liquid dispensed, and means actuated by said motor under the control of the meter for displacing one of the indicators away from an initial position in proportion to the volume of liquid dispensed and means actuated by the meter for displacing the other of said indicators away from an initial position in proportion to the volume of liquid dispensed.

6. In a liquid dispensing device the combination of a meter, a pump, a motor for actuating said pump to force liquid through said meter, an indicator for indicating the volume of liquid dispensed, a second indicator for indicating the cost of the liquid dispensed, and means actuated by said motor under the control of the meter for displacing one of the indicators away from an initial position in proportion to the volume of liquid dispensed, means actuated by the meter for displacing the other of said indicators away from an initial position in proportion to the volume of liquid dispensed and means actuated by said motor for resetting both indicators to zero.

7. In a liquid dispensing device the combination of a meter, a pump, a motor for actuating said pump to force liquid through said meter, an indicator for indicating the volume of liquid dispensed, a second indicator for indicating the cost of the liquid dispensed, and means actuated by said motor under the control of the meter for displacing both of the indicators away from an initial position in proportion to the liquid dispensed, and means actuated by said motor for resetting both said indicators to initial position.

8. In a liquid dispensing device the combination of a meter, a pump, a volume indicator, a cost indicator, means for resetting the indicators to zero, and a motor operatively connected to the pump and to at least one of said indicators, and to the resetting means, for simultaneously actuating the pump to force liquid through the meter and to actuate the indicator in accordance with the operation of the meter during a dispensing operation, and for actuating said resetting means to reset the indicators to zero prior to a subsequent dispensing operation.

9. In a liquid dispensing device the combination of a meter, a pump, a volume indicator, a cost indicator, means for resetting the indicators to zero, and a motor operatively connected to the pump and to both said indicators, and to the resetting means for simultaneously actuating the pump to force liquid through the meter and to actuate both indicators in accordance with the operation of the meter during a dispensing operation, and for actuating said resetting means to reset the indicators to zero prior to a subsequent dispensing operation.

10. In a liquid dispensing device the combination of a meter, a pump, a motor for actuating said pump to force liquid through said meter, an indicator connected to said meter and operated thereby for indicating the quantity of liquid dispensed, a register for indicating the cost of the liquid dispensed, and drive means for said register actuated by said pump motor, and operatively connected to the meter for actuating said register in accordance with the operation of said meter.

11. In a liquid dispensing device the combination of a meter, an indicator actuated by said meter to indicate the quantity of liquid dispensed, a motor, a second indicator for indicating the cost of the liquid dispensed, means variable in rate of operation in accordance with variations in cost of a unit of liquid, said means operatively connecting the meter to said second indicator, and means driven by the motor and through said variable means to actuate said second indicator in accordance with the operation of the meter.

12. In a liquid dispensing device the combination of a meter, a register adapted to be moved away from a predetermined position in proportion to the quantity of liquid dispensed, a motor, a cam, means including a clutch actuated by said cam connecting the motor to said register for driving the register, and means including a planetary system actuated jointly by said meter and said motor for actuating said cam in accordance with the relative rates of operation of the meter and register, to engage and disengage said clutch.

13. In a liquid dispensing device the combination of a meter, a register responsive to the operation of the meter and movable away from a predetermined position in proportion to the quantity of liquid dispensed, a motor, means including a clutch connecting the motor to said register for driving the register, a cam for actuating the clutch, and means responsive to a differential in the corresponding rates of operation of the meter and register for actuating said cam to move the clutch into engaged position when the rate of operation of the meter exceeds the corresponding rate of operation of the register and to move the clutch into disengaged position when the rate of operation of the register exceeds the corresponding rate of operation of the meter.

14. In a liquid dispensing apparatus, the combination of a source of liquid supply, a pump, the suction side of which is connected to said source, a motor for driving said pump, a meter connected to the outlet side of said pump and connected to dispensing means for measuring liquid dispensed through said dispensing means, cost registering means and amount registering means, one of said registering means being operated by said meter and the other registering means being operated by said motor, registering the cost of said liquid, and means for varying the speed of operation of one of said registering means in accordance with variations in the unit cost of said liquid per unit of measure.

15. In a liquid dispensing apparatus, the combination of a source of liquid supply, a pump, the suction side of which is connected to said source, a motor for driving said pump, a meter connected to the outlet side of said pump and connected to dispensing means for measuring liquid dispensed through said dispensing means, at least two registering means for registering data respecting the liquid dispensed, one of said registering means being operated by said meter and the other registering means being operated by said motor, and means for varying the speed of operation of one of said registering means relative to the other of said registering means.

CHARLES S. HAZARD.